(12) United States Patent
Kappock et al.

(10) Patent No.: US 9,156,997 B2
(45) Date of Patent: Oct. 13, 2015

(54) SYNTHESIS OF ZINC ACRYLATE COPOLYMER FROM ACID FUNCTIONAL COPOLYMER, ZINC PYRITHIONE, AND COPPER COMPOUND

(71) Applicant: Arch Chemicals, Inc., Norwalk, CT (US)

(72) Inventors: Paul S. Kappock, East Hampton, CT (US); Kazunobu Takahashi, Osaka (JP)

(73) Assignee: Arch Chemicals, Inc., Norwalk, CT (US)

( * ) Notice: Subject to any disclaimer, the term of this patent is extended or adjusted under 35 U.S.C. 154(b) by 0 days.

(21) Appl. No.: 13/785,958

(22) Filed: Mar. 5, 2013

(65) Prior Publication Data

US 2013/0183362 A1    Jul. 18, 2013

Related U.S. Application Data

(62) Division of application No. 12/660,053, filed on Feb. 19, 2010, now Pat. No. 8,541,493.

(51) Int. Cl.
| | |
|---|---|
| *C09D 5/16* | (2006.01) |
| *C04B 24/42* | (2006.01) |
| *C09D 133/02* | (2006.01) |
| *C08K 5/46* | (2006.01) |
| *C08L 33/02* | (2006.01) |
| *C09D 7/12* | (2006.01) |
| *C08K 5/00* | (2006.01) |

(52) U.S. Cl.
CPC .......... *C09D 5/1637* (2013.01); *C09D 5/1625* (2013.01); *C09D 7/1283* (2013.01); *C09D 133/02* (2013.01); *C08K 5/0091* (2013.01); *C08K 5/46* (2013.01); *C08L 33/02* (2013.01)

(58) Field of Classification Search
None
See application file for complete search history.

(56) References Cited

U.S. PATENT DOCUMENTS

| | | | | |
|---|---|---|---|---|
| 3,615,744 A * | 10/1971 | Yokoo et al. | ............... | 106/18.31 |
| 4,396,766 A * | 8/1983 | Farmer et al. | ...................... | 546/6 |
| 4,774,080 A * | 9/1988 | Yamamori et al. | ......... | 424/78.09 |
| 4,918,147 A * | 4/1990 | Yamamori et al. | ......... | 424/78.09 |
| 5,057,153 A * | 10/1991 | Ruggiero | ..................... | 106/18.33 |
| 5,080,892 A * | 1/1992 | Yamamori et al. | ......... | 424/78.09 |
| 5,098,473 A * | 3/1992 | Hani et al. | .................. | 106/18.33 |
| 5,112,397 A * | 5/1992 | Farmer et al. | ............. | 106/18.33 |
| 5,137,569 A * | 8/1992 | Waldron et al. | ............ | 106/18.33 |
| 5,185,033 A * | 2/1993 | Hani et al. | .................. | 106/18.33 |
| 5,232,493 A * | 8/1993 | Waldron et al. | ............ | 106/18.33 |
| 5,238,490 A * | 8/1993 | Farmer et al. | ............. | 106/18.33 |
| 5,246,489 A * | 9/1993 | Farmer et al. | ............. | 106/18.33 |
| 5,252,123 A * | 10/1993 | Hani et al. | .................. | 106/18.33 |
| 5,298,061 A * | 3/1994 | Waldron et al. | ............ | 106/18.33 |
| 5,342,437 A * | 8/1994 | Gavin et al. | ................ | 106/18.33 |
| 5,540,860 A * | 7/1996 | Hosseini et al. | ................ | 516/66 |
| 5,650,095 A * | 7/1997 | Hosseini et al. | ................ | 516/77 |
| 5,880,173 A * | 3/1999 | Matsuda et al. | .............. | 523/122 |
| 6,017,562 A * | 1/2000 | Kaufman et al. | ............. | 424/489 |
| 6,162,446 A * | 12/2000 | Hani et al. | ...................... | 424/401 |
| 6,177,530 B1 | 1/2001 | Sugihara et al. | | |
| 6,242,007 B1 * | 6/2001 | Mohseni et al. | .............. | 424/489 |
| 6,248,806 B1 * | 6/2001 | Codolar et al. | ................ | 523/177 |
| 6,432,432 B1 * | 8/2002 | Mohseni et al. | .............. | 424/405 |
| 6,458,878 B1 | 10/2002 | Tsuboi et al. | | |
| 6,821,326 B2 * | 11/2004 | Waldron et al. | ............ | 106/18.33 |
| 7,022,750 B2 * | 4/2006 | Camp et al. | .................... | 523/177 |
| 7,335,248 B2 * | 2/2008 | Abou-Nemeh | ............ | 106/18.34 |
| 7,435,771 B2 * | 10/2008 | Lei et al. | ......................... | 524/287 |
| 7,455,851 B1 * | 11/2008 | Nelson et al. | .................. | 424/406 |
| 7,481,873 B2 * | 1/2009 | Waldron et al. | ............ | 106/18.33 |
| 7,544,367 B2 | 6/2009 | Mohseni et al. | | |
| 7,659,397 B2 * | 2/2010 | Hidaka | .............................. | 546/6 |
| 7,691,938 B2 * | 4/2010 | Finnie | .......................... | 524/556 |
| 7,942,958 B1 * | 5/2011 | Gavin et al. | ................ | 106/18.36 |
| 2002/0110575 A1 * | 8/2002 | Gavin et al. | .................... | 424/408 |
| 2002/0197283 A1 * | 12/2002 | Mohseni et al. | .............. | 424/400 |
| 2003/0215522 A1 * | 11/2003 | Johnson et al. | ................ | 424/642 |
| 2004/0058855 A1 * | 3/2004 | Schwartz et al. | ................. | 514/6 |
| 2004/0118319 A1 * | 6/2004 | Waldron et al. | ............ | 106/18.33 |
| 2004/0191331 A1 * | 9/2004 | Schwartz et al. | ............. | 424/641 |
| 2005/0065232 A1 | 3/2005 | Okimoto et al. | | |
| 2005/0252408 A1 * | 11/2005 | Richardson et al. | ....... | 106/15.05 |
| 2006/0148977 A1 * | 7/2006 | Finnie | .......................... | 524/556 |
| 2007/0110700 A1 * | 5/2007 | Wells et al. | ................. | 424/70.21 |
| 2007/0117895 A1 * | 5/2007 | Lei et al. | ....................... | 524/287 |

(Continued)

FOREIGN PATENT DOCUMENTS

| | | |
|---|---|---|
| EP | 2204423 | 7/2010 |
| WO | WO 98/47372 | 10/1998 |
| WO | WO 2005/075582 | 8/2005 |
| WO | WO 2007074656 A1 * | 7/2007 |
| WO | WO 2007103013 | 9/2007 |
| WO | 2008/038967 | 4/2008 |
| WO | WO 2009031509 | 3/2009 |

OTHER PUBLICATIONS

Nakajima et al., "High performance liquid chromatographic determination of zinc pyrithione in antidandruff preparation based on copper chelate formation." (1990). Journal of Chromatography, vol. 502, is. 2, p. 379-384.

(Continued)

*Primary Examiner* — James J Seidleck
*Assistant Examiner* — Peter A Salamon
(74) *Attorney, Agent, or Firm* — Dority & Manning, P.A.

(57) ABSTRACT

Disclosed is a composition containing zinc ester functional polymer and particulate copper pyrithione, wherein the particles have an average aspect ratio within a range of from about 8 to about 15, where the zinc ester functional polymer and the copper pyrithione are obtained by reacting an acid functional polymer with zinc pyrithione and a copper salt or a copper carboxylate. Also disclosed is an antifouling coating containing such a composition.

29 Claims, 6 Drawing Sheets

(56) References Cited

U.S. PATENT DOCUMENTS

| | | | |
|---|---|---|---|
| 2007/0207178 A1 | 9/2007 | Waldron et al. | |
| 2009/0053166 A1* | 2/2009 | Niimoto | 424/78.09 |
| 2009/0215739 A1* | 8/2009 | Mohseni et al. | 514/188 |
| 2010/0021530 A1* | 1/2010 | Weinfield | 424/449 |
| 2010/0028391 A1* | 2/2010 | Okawa et al. | 424/401 |
| 2010/0278876 A1* | 11/2010 | Doumae et al. | 424/400 |
| 2011/0206632 A1 | 8/2011 | Kappock et al. | |

OTHER PUBLICATIONS

International Preliminary Report on Patentability and International Search Report for PCT/US2011/023865.
EP Search Report and Opinion for EP 11745044.
International Preliminary Report on Patentability and International Search Report for PCT/US2012/051251.

* cited by examiner

SYNTHESIS OF ZINC ACRYLATE COPOLYMER FROM ACID FUNCTIONAL COPOLYMER, ZINC PYRITHIONE, AND COPPER COMPOUND

CROSS-REFERENCE TO RELATED APPLICATIONS

This application is a divisional of and claims benefit of the priority of U.S. patent application Ser. No. 12/660,053, filed Feb. 19, 2010, and entitled "Synthesis of zinc acrylate copolymer from acid functional copolymer, zinc pyrithione, and copper compound," which is incorporated herein, in its entirety, by this reference.

FIELD OF THE INVENTION

The present invention relates to a composition including metal ester functional polymer and copper pyrithione, to a process for producing such a composition and to paint containing such a composition.

BACKGROUND OF THE INVENTION

Ships, fishnets or other underwater structures or equipments tend to attack aquatic organisms such as barnacles, mussels, and algae, and the like. Organisms can grow and multiply and eventually cause significant problems. For example, in the case of a ship's hull, the growth of marine organisms on the hull can increase the frictional resistance between the hull and water, thus increasing fuel consumption and reducing the speed of the ship.

One approach to the problems is to coat the surfaces of the structures with an antifouling coating in which a metal-containing polymer is present. These polymers normally have hydrolysable groups attached to the polymer backbone. Over time, the polymer at the outmost layer of the coating is hydrolyzed and becomes water erodible residue This residue is subsequently removed by water to provide a smooth, foul free surface. Such action is commonly referred to as a "self-polishing" effect.

Metal-containing self polishing copolymers have been in commercial use for many years. Since the ban on self-polishing tributyltin acrylate by the IMO, copper and zinc acrylates have become common polymers used in self polishing antifouling coatings.

Metal acrylates and methods of their preparation have been described in the literature.

Illustratively, U.S. Pat. No. 4,774,080 discloses a metal acrylate self polishing polymer obtained by reacting a copolymer with a monovalent organic acid and a metal oxide, chloride or hydroxide. Alternatively, the organic acid and metal salt can be replaced by a metal carboxylate. The copolymer used in the reaction can be obtained from the copolymerization of an unsaturated organic acid monomer and other polymerizable unsaturated monomers. Patent '080 also discloses that an unsaturated metal ester can first be prepared before copolymerizing with other unsaturated polymerizable monomers to provide a metal acrylate polymer. This reference is incorporated herein in its entirety.

U.S. Pat. No. 6,177,530, the disclosure of which is incorporated herein in its entirety, discloses a metal-containing hydrolysable copolymer obtained from the copolymerization of a metal-containing polymerizable monomer having two unsaturated groups and a metal-containing polymerizable monomer. Other polymerizable monomer can also be present.

Self-polishing polymers are used alone or in combination with other biocides to further enhance antifouling performance. When the polymers are used together with other biocides, the current practice is to prepare the polymers and the primary and supplemental biocides separately and then add them individually into antifouling paint compositions.

There is a need in the anti-fouling paint community for a cost effective process that can produce a mixture of metal-containing self polishing polymer and a booster biocide simultaneously. The present invention provides one answer to that need.

SUMMARY OF THE INVENTION

In one aspect, the present invention provides a composition containing a zinc ester functional polymer and particles of copper pyrithione where the particles have an average aspect ratio within a range of from about 8 to about 15. The zinc ester functional polymer and the copper pyrithione are obtained by reacting an acid functional polymer with zinc pyrithione and a copper compound selected from the group consisting of copper salts, copper carboxylates, copper hydroxide, elemental copper, and combinations thereof.

In another aspect, the present invention provides an antifouling coating composition comprising a zinc ester functional polymer and particles of copper pyrithione where the particles have an average aspect ratio ranging from about 8 to about 15. The zinc ester functional polymer and the copper pyrithione are obtained by reacting an acid functional polymer with zinc pyrithione and a copper compound selected from the group consisting of copper salts, copper carboxylates, copper hydroxide, elemental copper, and combinations thereof. The antifouling composition can further contain a water soluble or slightly water soluble resin.

In yet another aspect, the present invention relates to a process for making a composition containing a zinc ester functional polymer and particles of copper pyrithione where the particles have an average aspect ratio of from about 8 to about 15. The process includes the step of: reacting an acid functional polymer with zinc pyrithione and a copper compound selected from the group consisting of copper salts, copper carboxylates, copper hydroxide, elemental copper, and combinations thereof in a solvent.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
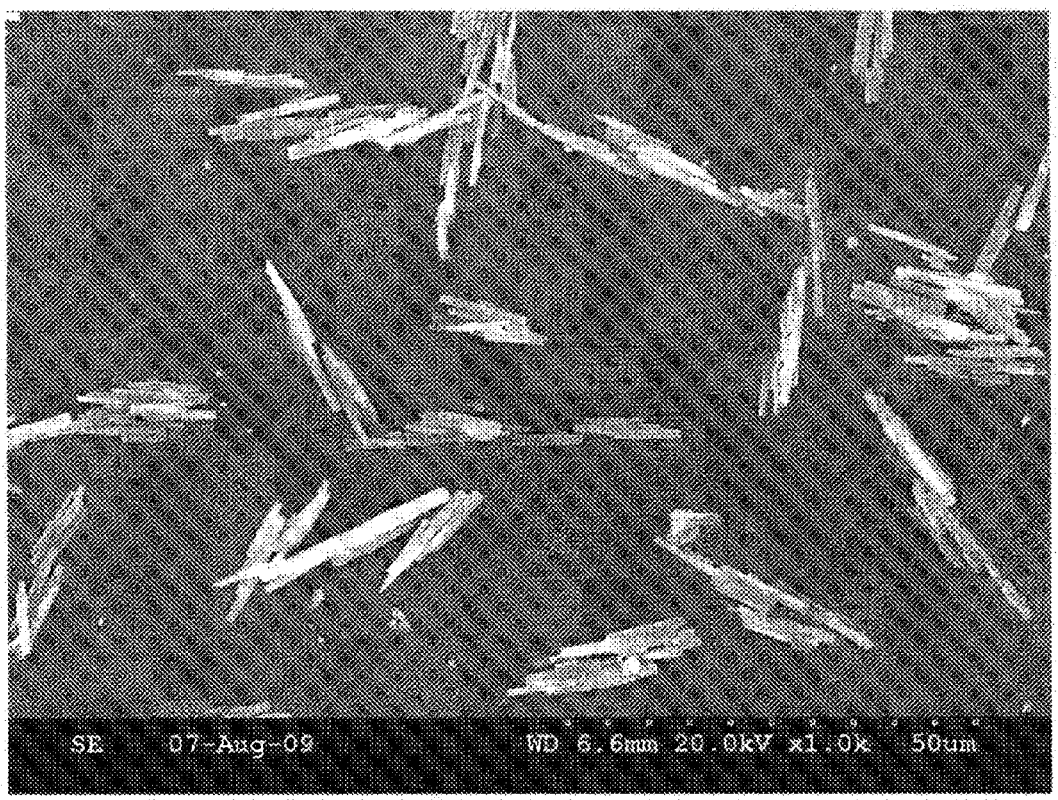
FIGS. 1 and 2 are scanning electron microscope (SEM) images of copper pyrithione, samples 507C and 508D, prepared in accordance with the process of the invention.

Applicants surprisingly found that zinc-containing self polishing polymers and copper pyrithione can be produced simultaneously from the reaction of an acid functional polymer, zinc pyrithione and a copper compound selected from the group consisting of copper salts, copper carboxylates, copper hydroxide, elemental copper, and combinations thereof. Compared with processes which involve the separate production of self polishing, zinc-containing polymers and a separately-added co-biocide, the process of the invention is efficient and cost-effective. Moreover, the copper pyrithione produced by the process of the invention is in the form of fine particles even when unmilled zinc pyrithione wet cake is employed as a starting material for the reaction. This feature provides cost savings by avoiding the need for drying and grinding or milling of copper pyrithione that would otherwise be required in accordance with conventional processes for producing paint grade copper pyrithione.

Applicants also surprisingly found that the copper pyrithione particles produced by the process of the invention fall within a unique range of average aspect ratios that is different from the range of ratios that is obtainable by milling copper pyrithione. Copper pyrithione particles within the unique range of average aspect ratios are less likely to agglomerate and/or settle out of compositions containing them, as compared with commercially available milled copper pyrithione.

The composition produced by the process of the invention can be incorporated into an anti-fouling coating composition. This anti-fouling coating composition exhibits better effects compared with an anti-fouling coating that contains the combination of commercially available self polishing polymers and milled copper pyrithione.

Accordingly, in one embodiment, the invention provides a composition containing a zinc ester functional polymer and particles of copper pyrithione where the particles have an average aspect ratio ranging from about 8 to about 15. Zinc ester functional polymers are not particularly limited and can be zinc acrylate, zinc polyesters, zinc alkyds, or combinations thereof. The preferred zinc ester functional polymers are zinc acrylates. The zinc ester functional polymers according to the present invention have self polishing effect. Suitable zinc ester functional polymers are described for example in U.S. Pat. No. 4,774,080, the disclosure of which is incorporated herein by reference in its entirety.

Preferably, copper pyrithione contained in the composition of the invention are fine particles having a D50 of about 3 to 5 microns. As used herein, the D50 is the diameter where 50% by weight of the copper pyrithione particles have diameters equal to or less than the D50 number, while just under 50% of the weight of the copper pyrithione is present in particles having a diameter greater than the D50 number. Particle diameter is preferably determined by Laser light scattering using a Horiba LA-910 particle size distribution analyzer.

Advantageously, the copper pyrithione particles according to the invention have an average aspect ratio ranging from about 8 to about 15, preferably from about 9 to about 12. In one embodiment, at least 5% of the particles have an average aspect ratio equal or greater than 20. As used herein, aspect ratio means the ratio of the longest to the shortest particle dimension. The copper pyrithione according to the present invention has a less degree of agglomeration, or settling than that of commercially available milled copper pyrithione. Without being bound by any theory, it is hypothesized that the copper pyrithione particles are wet out by the polymer as they are formed during the process of the invention, thus minimizing the risk of agglomeration and/or aggregation of the particles due to van der Waal forces.

In another embodiment, the present invention provides a process to produce a composition containing a zinc ester functional polymer and particles of copper pyrithione wherein the particles have an average aspect ratio of from about 8 to about 15. The process includes the step of reacting an acid functional polymer with zinc pyrithione and a copper compound selected from the group consisting of copper salts, copper carboxylates, copper hydroxide, elemental copper, and combinations thereof in a solvent.

Acid pendant polymers suitable for the present invention are not particularly limited. In a preferred embodiment, they are acid functional acrylate copolymers having a number average molecular weight (Mn) under 10,000, preferably between 2,000 and 6,000. The acrylate copolymers can be prepared by any methods known to a person skilled in the field. Typically, these copolymers are obtainable by polymerizing unsaturated organic acid monomers with other unsaturated monomers. The unsaturated organic acid monomer includes those compounds having at least one carboxyl group, for example, acrylic acid or methacrylic acid to provide the acid functionality. Examples of suitable other unsaturated monomers include, but are not limited to, methyl acrylate, methylmethacrylate, ethyl acrylate, ethyl methacrylate, butyl acrylate, butyl methacrylate, 2-ethylhexyl acrylate, 2-ethylhexyl methacrylate, 2-methoxyethyl acrylate, 2-ethoxyethyl acrylate, ethoxyethoxyethyl acrylate, 2-phenyoxyethyl acrylate, 2-hydroxyethyl acrylate, 2-hydroxypropyl acrylate, 4-hydroxybutyl acrylate, isobutyl methacrylate, tert-butylmethacrylate, acrylonitrile, isobutyl acrylate, tert-butyl acrylate, and combinations thereof.

Other non-acrylate monomers that may also be copolymerized include, but are not limited to, vinyl acetate, vinyl propionate, styrene, butyl fumarate, octyl fumarate, vinyl chloride, vinylidene chloride, vinyl floride, vinylidene floride, tetrafluoroethylene, ethylene, propylene, butadiene, chloroprene, isoprene, acrylamide, butyl maleate, octyl maleate, maleic anhydride, vinyl butyrate, vinyl methyl ether, vinyl alcohol, vinyl pyridine, vinyl toluene, and combinations thereof.

Monomers are typically chosen to provide an amorphous polymer with the required flexibility, hardness, hydrophilicity, and Tg appropriate for the conditions where the antifouling paint will be used. Polishing rate is controlled by the amount of acrylic acid or methacrylic acid monomer copolymerized. The more acid monomer, the more potential metal ester functionality the metal acrylate polymer will have. The more metal ester functionality, the higher the hydrolysis and, therefore, polishing rate will be, all else being equal. Acid functionality of the base polymer is measured in terms of acid number, also known as the acid value. A metal ester functional polymer with an acid value within a range of about 60 and about 140 is typical of self polishing copolymers used in antifouling paints.

The form of zinc pyrithione used in the reaction is not particularly limited. It can be in the form of an unmilled wet cake. Methods to produce zinc pyrithione are known to those skilled in the art and have been disclosed for example in U.S. Pat. No. 4,396,766, the disclosure of which is incorporated herein by reference in its entirety.

Exemplary copper salt used in the reaction includes, but is not limited to, copper carbonate, copper nitrate, copper sulfate, copper chloride, and combinations thereof.

When the copper compound used is a copper salt, copper hydroxide, or elemental copper, optionally organic acids can be added to the reaction mixture to control the degree of crosslinking. More organic acid used means more metal ester groups will be pendant rather than crosslinked, which in turn requires more zinc pyrithione and the copper compound for the reaction.

Exemplary organic acid includes, but is not limited to, acetic acid, chloroacetic acid, propionic acid, octylic acid, versatic acid, ethylhexanoic acid, benzoic acid, naphthenic acid, palmetic acid, stearic acid, oleic acid, or any fatty acid, rosin acids such as abietic acids, and combinations thereof. The preferred organic acid is acetic acid, naphthenic acid, and combinations thereof.

Alternatively, a copper carboxylate can be used in place of the combination of copper salt, copper hydroxide or elemental copper plus the organic acid. Representative and non-limiting examples of copper carboxylate include copper acetate, copper naphthenate, copper quinolinolate, copper stearate, copper benzoate, copper ethylhexanoate, copper rosinate, and combinations thereof. In a preferred embodiment, the copper carboxylate used is selected from copper acetate, copper naphthenate, and combinations thereof.

Typically, the reaction is carried out in the presence of a solvent. Preferably, the solvent contains at least a water miscible component so that water from the reaction and/or from the zinc pyrithione wet cake is miscible with the polymer solution. In some embodiments, the solvent contains a water miscible component and a water immiscible component. Advantageously, about 25% to about 50% of the solvent will be water miscible, depending on the organic acid used to form the pendant metal ester. Exemplary water miscible component includes, but is not limited to, methoxy propanol, methoxy butanol, methoxy-methylethoxy propanol, butoxy ethanol, ethoxy ethanol, and propanol. Exemplary water immiscible component includes, but is not limited to, xylene, toluene, ethyl benzene, naphthas, methyl isobutyl ketone, and cumene. Partially water miscible solvents such as methyl ethyl ketone or butanol may also be used. An exemplary solvent suitable for use in the process of the present invention is a combination of methoxy propanol and xylene.

The reaction can be conducted at room temperature or at elevated temperatures and under normal atmospheric pressure. In the reaction, it is not always necessary to use stoichiometric amounts of reactants to obtain the desired product. In some embodiments, it is suitable to use, in terms of molar equivalent ratio, zinc pyrithione: acid functional monomer in the acid functional polymer:copper compound=1:1.8-3.0: 0.8-1.5, preferably, 1:2.0-2.5:1.0-1.2, more preferably 1:2:1. If an organic acid is used in the reaction, the molar equivalent ratio of zinc pyrithione: the sum of organic acid plus acid functional monomer in the acid functional polymer:copper compound is 1:1.8-3.0:0.8-1.5, preferably, 1:2.0-2.5:1.0-1.2, more preferably 1:2:1.

In yet another embodiment, the present invention provides an antifouling coating composition containing zinc ester functional polymer and particles of copper pyrithione where the particles have an average aspect ratio ranging from about 8 to about 15. The zinc ester functional polymer and the copper pyrithione are obtained by reacting an acid functional polymer with zinc pyrithione and a copper compound selected from copper salts, copper carboxylates, copper hydroxide and combinations thereof. Preferably, zinc ester functional polymer and copper pyrithione combined are present in an amount of from about 5 to about 30, more preferably from about 10 to about 25, based on the total weight of the coating composition.

The anti-fouling coating composition of the invention may additionally contain one or more water soluble resins or slightly water soluble resins such as rosin, polyvinyl ether, chitosan, or combinations thereof. The formulating amount of these resins is preferably within the range of from about 1 to about 20%, more preferably from about 4 to about 15%, based on the total weight of the coating composition.

The anti-fouling coating composition may also include some other additives. For example, toxins to prevent hard fouling such as copper metal, cuprous oxide, copper thiocyanate, zinc oxide, zinc borate, barium metaborate, triphenly boron pyridine, triphenyl boron octidecyl amine, tralopyril, chlorfenapyr, tolylfluanid, or dichlofluanid; and toxins to control soft fouling such as zinc pyrithione, copper pyrithione, 4,5-dichloro-2-n-octyl-4-isothiazolin-3-one, 2-methylthio 4-tert-butyl amino-6-cyclopropyamino-s-triazine, zineb, ziram, polycarbamate, maneb, chlorothalonil, and any mixtures thereof.

The antifouling coatings according to the present invention can be prepared, for example, by adding resins and/or other toxins to a composition containing zinc ester functional polymer and particles of copper pyrithione, where the particles have an average aspect ratio ranging from about 8 to about 15 and admixing them by any conventional means.

The antifouling coating forms a dry film when it is coated on the substrate surface by a conventional technique and the solvent thereof is evaporated off at atmospheric temperature or elevated temperature.

The present invention is further described in detail by means of the following Examples. All parts and percentages are by weight and all temperatures are degrees Celsius unless explicitly stated otherwise.

EXPERIMENTAL

Example 1

Preparation of a Composition Containing Self-Polishing Polymer and Copper Pyrithione A. Preparation of Acid Functional Copolymer To a one liter reaction flask equipped with an addition funnel, a reflux condenser, a stirrer and a thermometer, were added 89.0 grams of methoxy propanol, 100.0 grams of xylene, and 16.0 grams of ethyl acrylate. The reaction mixture was brought up to 95.+−0.5.degree. C. while stirring at low speed under a nitrogen blanket.

The following monomers and initiators were premixed thoroughly in a separate flask: 40.0 grams of methyl methacrylate, 244.0 grams of ethyl acrylate, 40.0 grams of 2-methoxyethyl acrylate, 60.0 grams of methacrylic acid, 10.0 grams of 2,2'-azobis(2-methylpropionitrile), 28.0 grams of 2,2-azobis(2-methylbutanenitrile), 4.0 grams of methyl styrene dimer and 40.0 grams of methoxypropanol. The monomer/initiator mixture was transferred to the addition funnel mounted on the reaction flask; and was added at a constant rate to the reaction flask over a period of 6 hours at 95.+−0.5.degree. C. while stirring continuously.

Next, the addition funnel was charged with premixed methoxypropanol (40.0 grams) and t-butylperoxy 2-ethylhexyl carbonate (2.0 grams). This chaser mixture was added into the reaction flask over the course of one half hour at 95.+−0.5.degree. C. The reaction mixture was stirred for an additional 1½ hours at 95.+−0.5.degree. C. Methoxypropanol (32.0 grams) was added and the reaction mixture was allowed to cool down to room temperature while stirring constantly.

Gel permeation chromatography was used to measure the molecular weight of the polymer. The number molecular weight average (Mn)) was measured at about 3,000 and weight average molecular weight (Mw) was measured at about 7,000. The acid value was calculated to be about 90.

B. Preparation of a Composition Containing Zinc Acrylate Polymer and Copper Pyrithione To a ½ pint mixing vessel was added 93.0 grams of the acid functional acrylic polymer solution prepared above. The mixing vessel was placed under a high speed cowles type disperser with a 1' blade. The mixer was turned to 1000 rpm. To the mixing vessel were added 25.9 grams of 60% solids zinc pyrithione wet cake, 26.3 grams of methoxypropanol, and 3.0 grams of acetic acid. The speed of the mixer was increased to 2000 rpm. To the mixing vessel, was added 1.45 grams of copper hydroxide (58% copper), followed by 10 minutes of mixing and succeeding addition of three more batches of copper hydroxide (1.45 grams each batch). Once the reaction mixture had turned a dark green color, 2.50 grams of $NH_4OH$ (29.6%) was added to the mixing vessel and the stirring was continued for 30 minutes to provide a composition containing zinc acrylate polymer and copper pyrithione.

Comparative Example 1

Preparation of Zinc Acrylate Polymer Using the Technology of U.S. Pat. No. 4,774,080

The zinc acrylate polymer used for comparison to the present invention was made using the technology of U.S. Pat. No. 4,774,080. Starting with the acid function polymer described in the preparation of example 1, the zinc acrylate was made by adding 14.6 grams of zinc oxide to 100.0 grams of the acid functional polymer (53.0% non volatile), 80.0 grams of methoxy propanol, 3.3 grams of water, and 5.05 grams of naphthenic acid in a reaction flask equipped with a reflux condenser, nitrogen inlet, addition funnel, and temperature probe. The mixture was brought to 100.+−0.5.degree. C. Separately, 15.0 grams of naphthenic acid was mixed with 300.0 grams of the acid functional polymer and poured into the addition funnel. This mixture was added drop wise to the reaction flask over the course of 6 hours under a nitrogen blanket, and reacted for an additional 2 hours to yield a 46.3% solids zinc acrylate copolymer.

Example 2

Analysis of the Copper Pyrithione Formed from the Process of the Invention

A. Sample Preparation

Three samples were prepared as shown below:

Samples: 507C, copper pyrithione as prepared from Example 1, step B, methyoxypropanol was used as solvent;

508D, copper pyrithione as prepared from Example 1, step B, methoxypropanol/xylene was used as solvent;

513, ACM copper pyrithione commercially available from Arch Chemicals, Inc.

B. Microscopic Images

Figure 2:
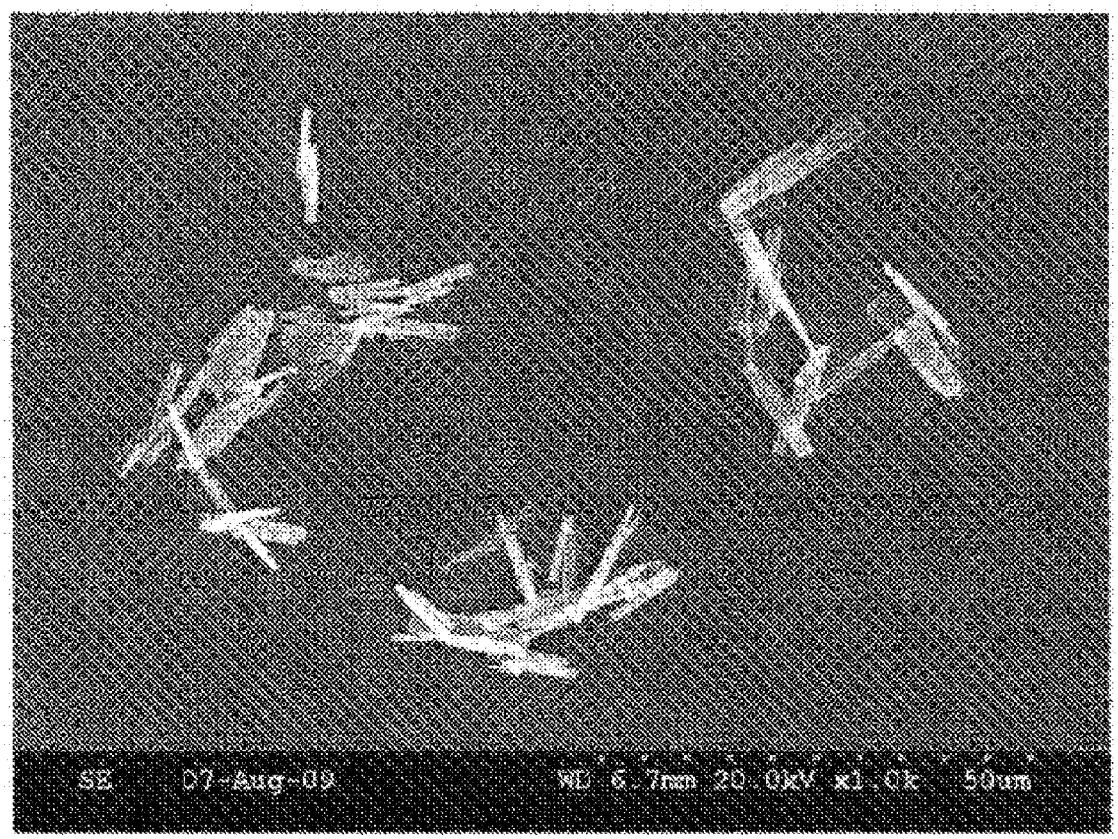
Figure 3:
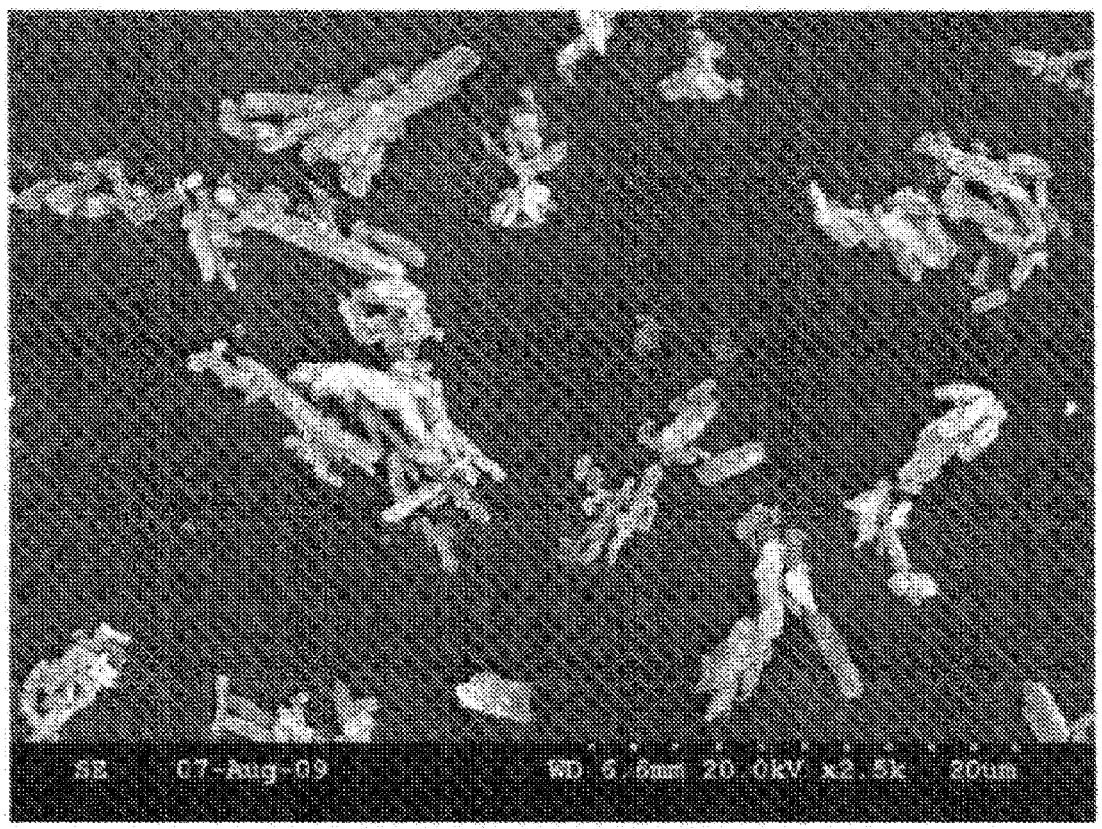
FIG. 3 is a SEM image of commercially available copper pyrithione, sample 513.

Microscopic images of samples 507C, 508D and 513 are shown in FIGS. 1-3. All images were obtained using a Hitachi S-300N Scanning electron Microscope.

B. Aspect Ratio Analysis

Procedure: Aspect ratio was determined by superimposing a micron scale over the particle images and visually comparing the width and length of the particles to the scale. Length divided by width determines the aspect ratio. The images were obtained using a Hitachi S-300N Scanning electron Microscope.

Results: The results shown in Table 1 demonstrate that the particulate copper pyrithione prepared from the process of the invention has much higher average aspect ratio compared with that of the commercially available milled copper pyrithione (12.2 and 9.1 versus 4.3). In addition, for both of the copper pyrithione samples of the invention, there are at least 5% of the particles having an aspect ratio greater than or equal to 20, whereas in the commercially available milled copper pyrithione, none of the particles have an aspect ratio greater than 15.

TABLE 1

Aspect Ratio-Length/Width

| 507C-Particles 4 to 15 microns long | | | 508D-Particles 0.4 to 6 microns long | | | 513-Particles 0.4 to 6 microns long | | |
| --- | --- | --- | --- | --- | --- | --- | --- | --- |
| AR | Number | AR x # | AR | Number | AR x # | AR | Number | AR x # |
| 4 | 1 | 4 | 2 | 2 | 4 | 1 | 21 | 21 |
| 5 | 10 | 50 | 4 | 14 | 56 | 2 | 42 | 84 |
| 6 | 6 | 36 | 5 | 26 | 130 | 3 | 41 | 123 |
| 7 | 34 | 238 | 6 | 12 | 72 | 4 | 14 | 56 |
| 8 | 20 | 160 | 7 | 32 | 224 | 5 | 31 | 155 |
| 10 | 54 | 540 | 8 | 5 | 40 | 6 | 6 | 36 |
| 12 | 28 | 336 | 10 | 27 | 270 | 7 | 14 | 98 |
| 15 | 26 | 390 | 12 | 9 | 108 | 10 | 10 | 100 |
| 17 | 11 | 187 | 15 | 19 | 285 | 12 | 8 | 96 |
| 20 | 23 | 460 | 20 | 9 | 180 | 15 | 3 | 45 |
| 22 | 6 | 132 | 25 | 3 | 75 | | | |
| 25 | 7 | 175 | | | | | | |
| 30 | 3 | 90 | | | | | | |
| | 229 | 2798 | | 158 | 1444 | | 190 | 814 |
| Ave. Aspect Ratio | | 12.2 | Ave. Aspect Ratio | | 9.1 | Ave. Aspect Ratio | | 4.3 |

C. Agglomeration—Settling Data

Figure 4:
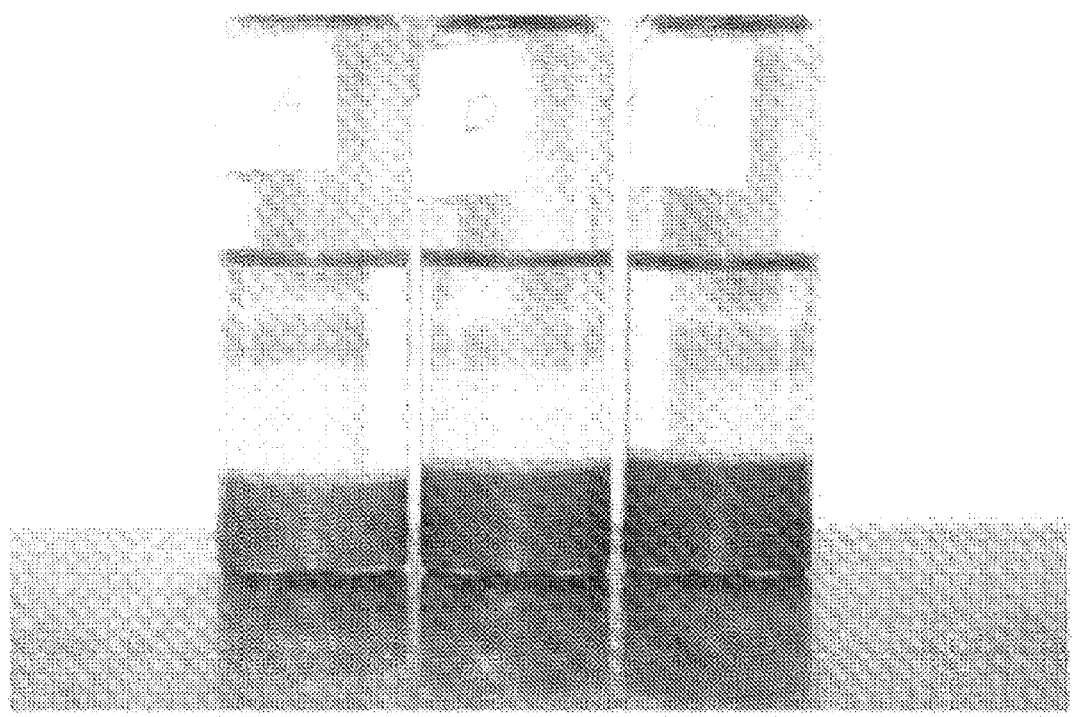
FIG. 4 is a photo of samples A, C and D taken 1 hour after the samples were prepared.
Figure 5:
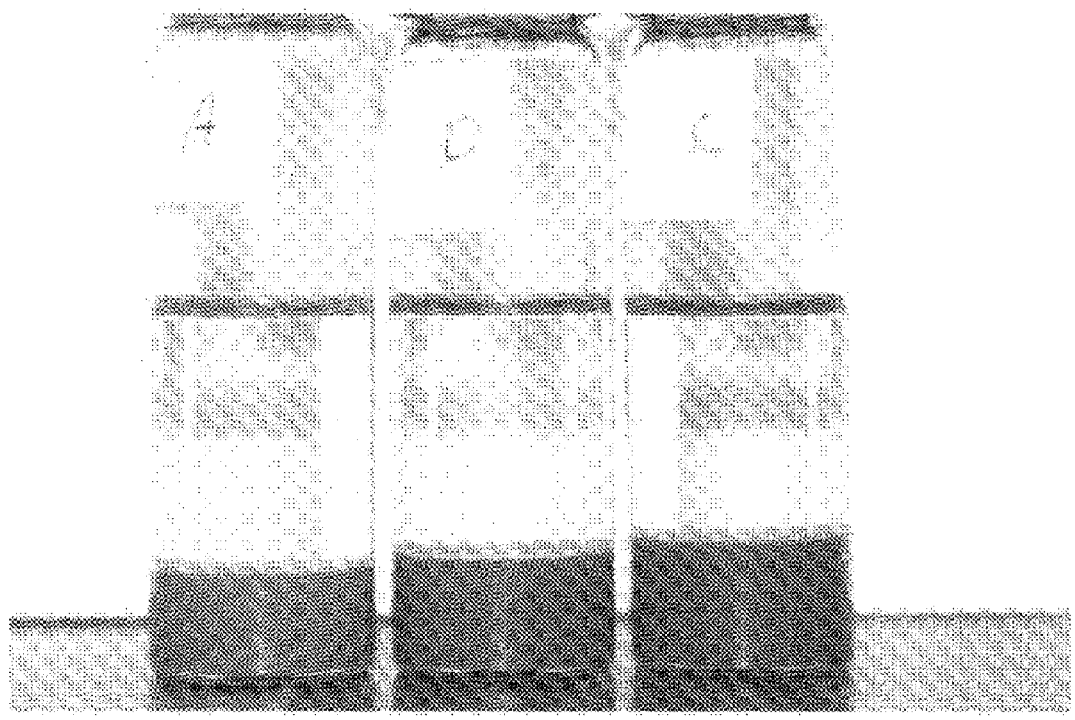
FIG. 5 is a photo of samples A, C and D taken 1 day after the samples were prepared.

Equal weights of samples 507C, 508D and 513 as described in Example 2, part B were mixed in equal weights of xylene to provide samples C, D and A. The samples were measured for settling after one hour (FIG. 4) and after 24 hours (FIG. 5). Both samples of the in situ formed particles (C and D) settled less than the conventional process copper pyrithione (A). The one with the higher aspect ratio (C) settled the least.

Example 3

Antifouling Coating Composition

A coating composition according to the invention (P) was prepared by blending the composition obtained from Example 1 together with other materials detailed in Table 2 using a high speed mixer.

A comparison coating composition (J) was obtained by blending zinc acylate prepared from comparative Example 1, commercially available copper pyrithione and other materials as shown in Table 2 using a high speed mixer.

TABLE 2

| Component wt % | J | P |
|---|---|---|
| Zinc acrylate of comparative example 1 (52% NV) | 17.9 | 0 |
| Copper pyrithione powder | 2.6 | 0 |
| Zinc Acrylate/Copper pyrithione mix from example 1 (35% polymer/10% copper pyrithione) |  | 26.0 |
| Wood Rosin (50% in xylene solution) | 16.1 | 16.1 |
| Xylene | 9.4 | 6.4 |
| Tritolylphosphate | 0.5 | 0.5 |
| Nytal 3300 (talc) | 7.0 | 7.0 |
| Zinc Oxide (Kadox911) | 4.0 | 4.0 |
| Cuprous Oxide (Chemet N97) | 40.0 | 40.0 |
| Attapulgite (Attagel 50) | 1.0 | 0 |
| Disparlon A650-20X (polyamide wax) | 1.5 | 0 |

Next, each of the above coating compositions J and F was applied twice by roller for a total of two antifouling coatings onto two glass reinforced polyester (GRP) panels previously primed with 2 part epoxy. The total weight of dry antifouling coating for each panel is shown below:

| J-1 | J-2 | P-1 | P-2 |
|---|---|---|---|
| 35.85 | 36.36 | 33.86 | 35.41 |

Figure 6:
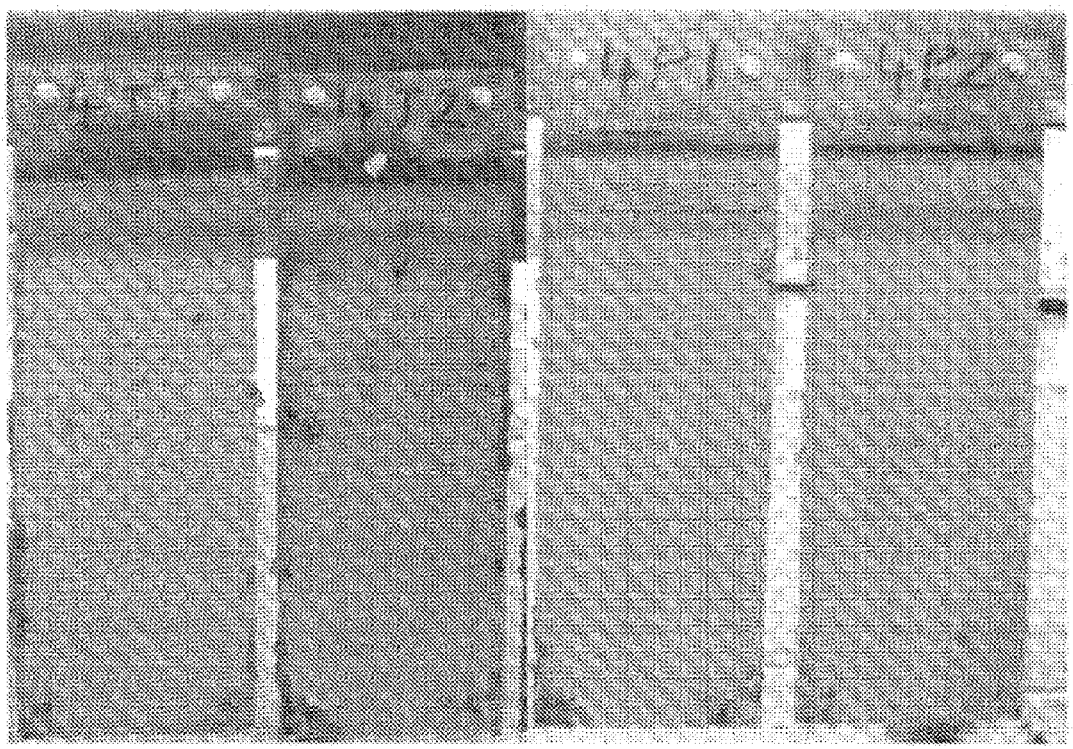
FIG. 6 is a photo showing panel testing results.

The above test panels were then fastened to a 2"×6"×8' pressure treated southern yellow pine board and hung vertically in sea water for 1 year. The test was conducted at Rybovich Marina in West Palm Beach, Fla. and the results were shown in FIG. 6.

The results indicate that the coating composition of the invention, which contains zinc acrylate polymer and in situ generated copper pyrithione, performs better than in terms of antifouling efficacy the coating composition that includes zinc acrylate polymer and milled copper pyrithione prepared by a conventional process.

What is claimed is:

1. A composition comprising a zinc ester functional polymer and particles of copper pyrithione,
    wherein said zinc ester functional polymer and said copper pyrithione are obtained by reacting an acid functional polymer with zinc pyrithione and a copper compound selected from the group consisting of copper salts, copper carboxylates, copper hydroxide, elemental copper, and combinations thereof, and
    wherein when the copper compound is a copper salt, the copper salt is selected from the group consisting of copper carbonate, copper nitrate, copper sulfate, copper chloride, and combinations thereof, and
    wherein said particles have an average aspect ratio within a range of from about 8 to about 15 and a D50 of from about 3 to about 5 microns.

2. The composition of claim 1, wherein said zinc ester functional polymer is a zinc acrylate polymer.

3. The composition of claim 1, wherein said copper compound is copper hydroxide.

4. The composition of claim 1, wherein said acid functional polymer is an acid functional acrylate copolymer.

5. The composition of claim 4, wherein the acid functional acrylate copolymer has a number average molecular weight under 10,000.

6. The composition of claim 5, wherein the acid functional acrylate copolymer has a number average molecular weight of between 2,000 and 6,000.

7. The composition of claim 4, wherein the acid functional acrylate copolymer is derived from an unsaturated organic acid monomer selected from the group consisting of acrylic acid, methacrylic acid, and combinations thereof.

8. The composition of claim 4, wherein said copper compound is a copper salt and the copper salt is selected from the group consisting of copper carbonate, copper nitrate, copper sulfate, copper chloride, and combinations thereof.

9. The composition of claim 4, wherein said copper compound is copper hydroxide.

10. The composition of claim 1, further comprising an organic acid selected from the group consisting of acetic acid, chloroacetic acid, propionic acid, octylic acid, versatic acid, ethylhexanoic acid, benzoic acid, naphthenic acid, palmetic acid, stearic acid, oleic acid, fatty acids, rosin acids, and combinations thereof.

11. The composition of claim 9, further comprising an organic acid selected from the group consisting of acetic acid, chloroacetic acid, propionic acid, octylic acid, versatic acid, ethylhexanoic acid, benzoic acid, naphthenic acid, palmetic acid, stearic acid, oleic acid, fatty acids, rosin acids, and combinations thereof.

12. The composition of claim 10, wherein said organic acid is acetic acid or naphthenic acid.

13. The composition of claim 11, wherein said organic acid is acetic acid or naphthenic acid.

14. The composition of claim 1, wherein said copper carboxylate is selected from the group consisting of copper acetate, copper naphthenate, copper quinolinolate, copper stearate, copper benzoate, copper ethylhexanoate, copper rosinates, and combinations thereof.

15. The composition of claim 14, wherein said copper carboxylate is copper acetate or copper naphthenate.

16. The composition of claim 1, wherein said aspect ratio of said copper pyrithione particles ranges from about 9 to about 12.

17. An antifouling coating composition containing the composition of claim 1.

18. An antifouling coating composition containing the composition of claim 4.

19. The antifouling coating composition of claim 18, further comprising a water soluble or slightly water soluble resin, wherein said resin is present in an amount of from about 4 to about 15% based on the total weight of the coating composition.

20. The antifouling coating composition of claim 19, wherein the resin is selected from the group consisting of rosin, polyvinyl ether, chitosan, and combinations thereof.

21. The antifouling coating composition of claim 18, further comprising an additive selected from the group consisting of copper metals, copper oxide, copper thiocyanate, zinc oxide, zinc borate, barium metaborate, triphenyl boron pyridine, triphenyl boron octidecyl amine, tralopyril, chlorfenapyr, tolyfluanid, dichlofluanid, zinc pyrithione, 4,5-dichloro-2-n-octyl-4-isothiazolin-3-one, 2-methylthis-4-tert-butyl amino-6-cyclopropyamino-s-triazine, zineb, ziram, polycarbamate, maneb, chlorothalonil, and combinations thereof.

22. A composition comprising a zinc ester functional polymer and particles of copper pyrithione,
wherein said particles have an average aspect ratio within a range of from about 8 to about 15 and a D50 of from about 3 to about 5 microns.

23. The composition of claim 22, wherein the zinc ester functional polymer is a zinc acrylate polymer.

24. The composition of claim 22, wherein said aspect ratio of the copper pyrithione particles ranges from about 9 to about 12.

25. The composition of claim 22, wherein the composition further comprises an organic acid selected from the group consisting of acetic acid, chloroacetic acid, propionic acid, octylic acid, versatic acid, ethylhexanoic acid, benzoic acid, naphthenic acid, palmetic acid, stearic acid, oleic acid, fatty acids, rosin acids or a combination thereof.

26. The composition of claim 22, wherein the composition further comprises acetic acid, naphthenic acid, or a combination thereof.

27. An antifouling coating composition containing the composition of claim 22.

28. The antifouling coating composition of claim 27, wherein the composition further comprises a resin in an amount of from about 4 to about 15% based on the total weight of the antifouling coating composition.

29. The antifouling coating composition of claim 28, wherein the resin is selected from the group consisting of rosin, polyvinyl ether, chitosan, and a combination thereof.

* * * * *